United States Patent
Uratani et al.

(10) Patent No.: US 8,689,569 B2
(45) Date of Patent: Apr. 8, 2014

(54) COOLING CONTROL CIRCUIT FOR PELTIER ELEMENT

(75) Inventors: Yutaka Uratani, Shiga-ken (JP); Mikihiro Yamashita, Shiga-ken (JP)

(73) Assignee: Panasonic Corporation, Osaka (JP)

(*) Notice: Subject to any disclaimer, the term of this patent is extended or adjusted under 35 U.S.C. 154(b) by 156 days.

(21) Appl. No.: 13/393,021

(22) PCT Filed: Sep. 21, 2010

(86) PCT No.: PCT/JP2010/066742
§ 371 (c)(1),
(2), (4) Date: Feb. 28, 2012

(87) PCT Pub. No.: WO2011/037243
PCT Pub. Date: Mar. 31, 2011

(65) Prior Publication Data
US 2012/0151940 A1 Jun. 21, 2012

(30) Foreign Application Priority Data

Sep. 25, 2009 (JP) ................................. 2009-221517

(51) Int. Cl.
*F25B 21/02* (2006.01)
(52) U.S. Cl.
USPC ............................................... 62/3.2; 62/3.7
(58) Field of Classification Search
USPC ................. 62/3.2, 3.7, 259.2; 361/79, 86, 87; 374/13, 20; 324/522, 713; 257/E27.008, 930
See application file for complete search history.

(56) References Cited

U.S. PATENT DOCUMENTS

| | | | | |
|---|---|---|---|---|
| 3,195,345 A * | 7/1965 | Thiele | ............................ | 374/20 |
| 3,303,537 A * | 2/1967 | Mislan | ....................... | 164/154.4 |
| 3,435,223 A * | 3/1969 | Haner, Jr. et al. | ............. | 250/352 |
| 3,496,837 A * | 2/1970 | McEuen | ......................... | 91/471 |
| 5,515,682 A | 5/1996 | Nagakubo et al. | | |
| 6,012,291 A * | 1/2000 | Ema | ................................. | 62/3.7 |
| 6,094,918 A * | 8/2000 | Burbidge et al. | ................. | 62/3.7 |
| 6,326,610 B1 * | 12/2001 | Muramatsu et al. | .......... | 250/238 |
| 6,512,209 B1 | 1/2003 | Yano | | |
| 6,803,672 B2 * | 10/2004 | Gunasekera | .................... | 307/9.1 |
| 6,826,916 B2 * | 12/2004 | Shimada et al. | ................. | 62/3.2 |
| 7,082,772 B2 * | 8/2006 | Welch | ................................ | 62/3.2 |
| 2002/0162338 A1* | 11/2002 | Shimada et al. | ................. | 62/3.7 |
| 2003/0039290 A1* | 2/2003 | Ichino et al. | .................... | 372/48 |
| 2006/0191887 A1* | 8/2006 | Baer et al. | ..................... | 219/219 |

FOREIGN PATENT DOCUMENTS

JP 2006-026629 A 2/2006

* cited by examiner

*Primary Examiner* — Mohammad M Ali
(74) *Attorney, Agent, or Firm* — Wolf, Greenfield & Sacks, P.C.; Randy J. Pritzker

(57) ABSTRACT

A Peltier element cooling control circuit that accurately controls a small number of elements with a simple structure. First and second amplification circuits are connected between a current detection resistor detecting current of a Peltier element and a current control circuit performing current control on the Peltier element based on voltage proportional to the current. One of two resistors determines the amplification rate of the first amplification circuit includes a thermistor. When the ambient temperature is equal to a predetermined temperature or greater, the output voltage of the second amplification circuit is supplied to the current control circuit to control the current of the Peltier element so as to be constant. When the ambient temperature is less than the predetermined temperature, the output voltage of the first amplification circuit is supplied to the current control circuit to control the current of the Peltier element in accordance with the temperature characteristics.

6 Claims, 3 Drawing Sheets

COOLING CONTROL CIRCUIT FOR PELTIER ELEMENT

BACKGROUND OF THE INVENTION

1. Related Applications

This application is a U.S. National Phase of PCT/JP2010/066742, filed on Sep. 21, 2010, which claims priority to Japanese Patent Application No. 2009-221517, filed on Sep. 25, 2009, the entirety of which is incorporated herein.

2. Background Art

In the prior art, Japanese Laid-Open Patent Publication No. 2006-26629 describes controlling the cooling of Peltier elements to generate condensed water from the moisture in the air.

In Japanese Laid-Open Patent Publication No. 2006-26629, the cooling of Peltier elements is controlled to appropriately cool a discharge electrode and the moisture in the air. This generates condensed water on the discharge electrode. High voltage is applied to the condensed water, which is generated in this manner, to perform electrostatic atomization. This generates charged fine water droplets of nanometer size that includes radicals.

The cooling control of the Peltier elements is normally performed by executing constant voltage control. However, when there are only a few Peltier elements, the generated voltage is small. As a result, lead wires and connectors connecting a Peltier module to other circuits affect and inhibit accurate control. Further, the cooling control of the Peltier elements must be performed in accordance with the ambient temperature. However, such control would result in a complicated circuit.

DISCLOSURE OF THE INVENTION

It is an object of the present invention to provide a Peltier element cooling control circuit that accurately controls a small number of Peltier elements with a simple structure in accordance with the ambient temperature.

One aspect of the present invention is a cooling control circuit for a Peltier element. The cooling control circuit includes a current detection resistor, a first amplification circuit, a second amplification circuit, and a current control circuit. The current detection resistor is used to detect current flowing to the Peltier element and including a first terminal, which is connected to the Peltier element, and a second terminal. The first amplification circuit includes a first operational amplifier, a first resistor, and a second resistor. The first operational amplifier has a non-inverting input terminal, which is connected to the first terminal of the current detection resistor, an inverting input terminal, and an output terminal. The first resistor includes a thermistor and connected between the inverting input terminal of the first operational amplifier and the output terminal of the first amplifier. The second resistor is connected between the second terminal of the current detection resistor and the inverting input terminal of the first operational amplifier. The second amplification circuit includes a second operational amplifier, a third resistor, and a fourth resistor. The second operational amplifier has a non-inverting input terminal, which is connected to the first terminal of the current detection resistor, an inverting input terminal, and an output terminal. The third resistor is connected between the inverting input terminal of the second operational amplifier and the output terminal of the second amplifier. The fourth resistor is connected between the second terminal of the current detection resistor and the inverting input terminal of the second operational amplifier. The current control circuit receives output voltage of the second amplification circuit when the ambient temperature is greater than or equal to a predetermined temperature and controls the current flowing to the Peltier element so as to be constant based on the output voltage of the second amplification circuit, and receives output voltage of the first amplification circuit that is in accordance with the temperature characteristics of the thermistor when the ambient temperature is less than the predetermined temperature and controls the current flowing to the Peltier element based on the output voltage of the first amplification circuit.

DESCRIPTION OF EMBODIMENTS

The present invention will now be discussed with reference to the accompanying drawings.

Figure 4:
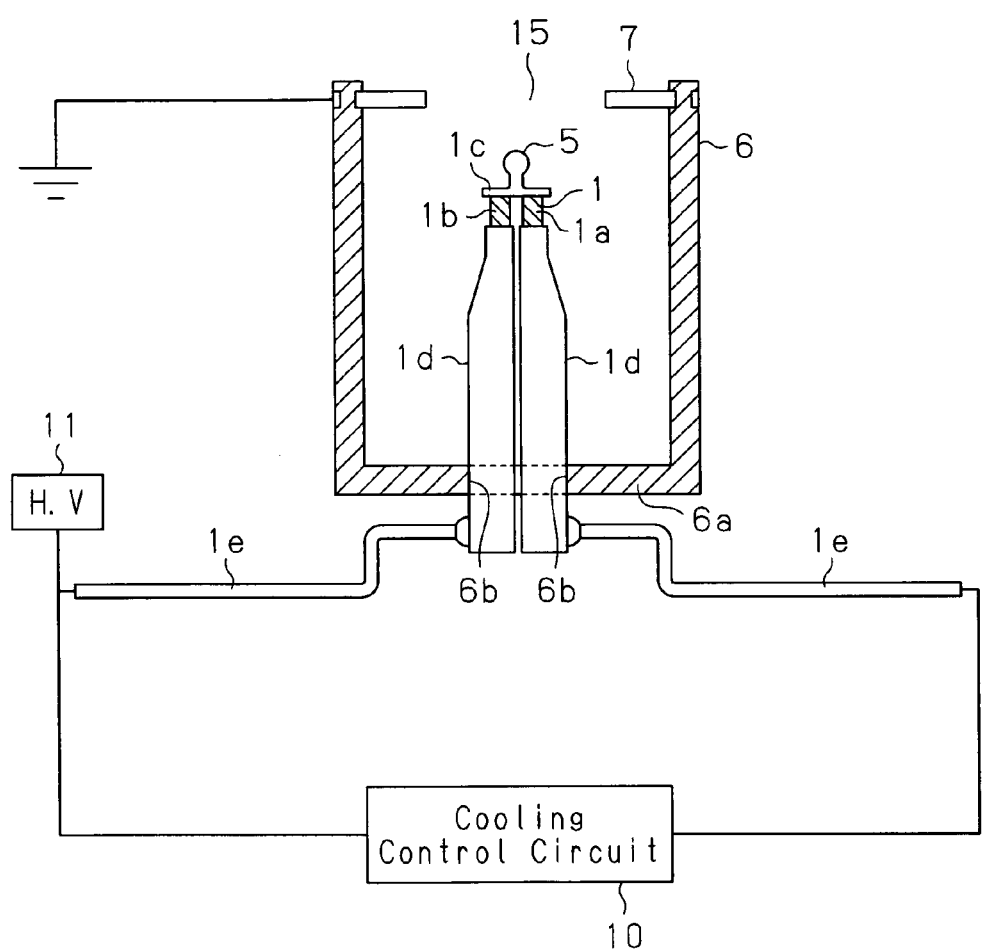
FIG. 4 is a schematic diagram showing an electrostatic atomization device using a Peltier element cooling control circuit according to one embodiment of the present invention.

FIG. 4 is a schematic diagram showing an electrostatic atomization device using a Peltier element cooling control circuit 10 according to one embodiment of the present invention. A Peltier element 1 includes a P type semiconductor 1a, an N type semiconductor 1b, an electrical connector 1c, and heat dissipation conductors 1d. The electrical connector 1c connects heat absorption surfaces of the P type semiconductor 1a and N type semiconductor 1b. The heat dissipation conductors 1d are formed from a conductive material and connected to heat dissipation surfaces of the P type semiconductor 1a and N type semiconductor 1b. A lead wire 1e is connected to each heat dissipation conductor 1d.

A discharge electrode 5 is formed on the electrical connector 1c at the side facing away from the heat absorption surfaces.

The two heat dissipation conductors 1d each have a basal portion. A tubular housing 6, which is formed from an insulative material, includes a basal end closed by a bottom wall 6a. The basal portion of each heat dissipation conductor 1d is inserted through a hole 6b extending through the bottom wall 6a so that the two heat dissipation conductors 1d are coupled to the housing 6 and the discharge electrode 5 is accommodated in the housing 6.

The tubular housing 6, which has a closed basal end, includes an open distal end. An opposing electrode 7 opposed to the discharge electrode 5 is supported in the opening at the distal end of the housing 6. The opposing electrode 7 is annular and connected to ground. A discharge hole 15 extends through the central part of the opposing electrode 7.

Figure 1:
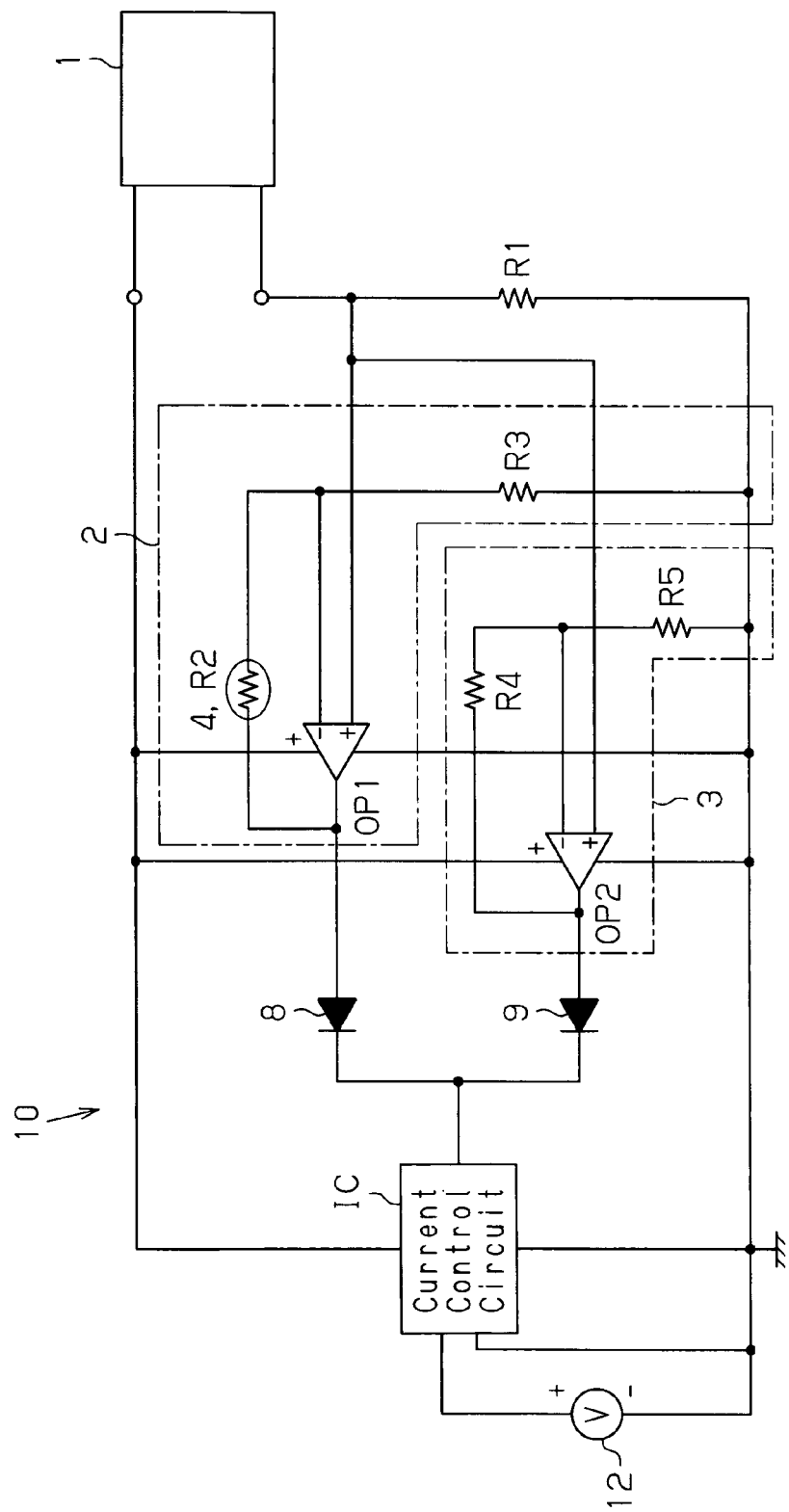
FIG. 1 is a schematic circuit diagram of a Peltier element cooling control circuit according to one embodiment of the present invention.

The two heat dissipation conductors 1d of the Peltier element 1 are electrically connected to a current path, which includes the lead wires 1e. The current path is connected to the cooling control circuit 10 and a high voltage application unit 11, which applies high voltage to the discharge electrode 5. The cooling control circuit 10 includes a DC power supply 12 (FIG. 1).

The cooling control circuit 10 controls the cooling of the Peltier element 1 and cools the electrical connector 1c and the discharge electrode 5, which are located on the heat absorption side. When cooling the discharge electrode 5 in this manner, the moisture in the air is cooled. This generates condensed water on the discharge electrode 5. The generation of condensed water supplies the discharge electrode 5 with water. Heat is dissipated from the heat dissipation conductors 1d.

In a state in which condensed water is generated on the discharge electrode 5, when the high voltage application unit 11 applies high voltage to the discharge electrode 5, an electrostatic atomization phenomenon occurs in the condensed water generated on the discharge electrode 5. This generates a large amount of charged fine water droplets of nanometer size that includes radicals.

Figure 2:
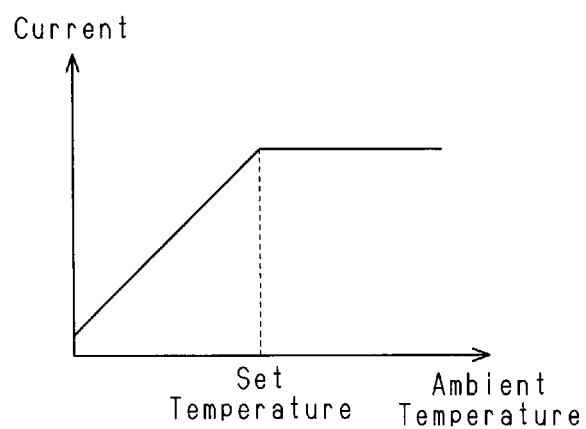
FIG. 2 is a graph showing the relationship between the ambient temperature and current when controlling the cooling of a Peltier element in FIG. 1.

In one embodiment of the present invention, a current control circuit IC of the cooling control circuit 10 performs cooling control on the Peltier element 1 based on voltage, which is proportional to the current flowing through the Peltier element 1. Referring to FIG. 2, the cooling control includes constant current control performed when the ambient temperature is greater than or equal to a predetermined temperature. The cooling control also includes current control performed to decrease the current as the ambient temperature decreases when the ambient temperature is less than the predetermined temperature.

FIG. 1 is a schematic circuit diagram of the cooling control circuit 10 according to one embodiment of the present invention. The cooling control circuit 10 performs control in accordance with the ambient temperature as shown in FIG. 2.

The cooling control circuit 10 includes a current detection resistor R1 and the current control circuit IC. The current detection resistor R1 detects the current flowing to the Peltier element 1. The current control circuit performs current control on the Peltier element 1 based on the voltage that is proportional to the current flowing to the Peltier element 1. The cooling control circuit 10 further includes first and second amplification circuits 2 and 3 connected between the current detection resistor R1 and the current control circuit IC.

The first amplification circuit 2 includes an operational amplifier OP1 and two resistors R2 and R3, which are connected in series between a first terminal of the resistor R1 and an output terminal of the operational amplifier OP1. The two resistors R2 and R3 determine the amplification rate of the operational amplifier OP1. Among the two resistors R2 and R3, the resistor R2 is a thermistor 4. The thermistor 4 has a first end (node between the resistors R2 and R3), which is connected to an inverting input terminal of the operational amplifier OP1, and a second end, which is connected to an output terminal of the operational amplifier OP1. The operational amplifier OP1 has a non-inverting input terminal connected to a second terminal of the resistor R1 and the corresponding heat dissipation conductor 1d of the Peltier element 1.

The second amplification circuit 3 includes an operational amplifier OP2 and two resistors R4 and R5, which are connected in series between the first terminal of the resistor R1 and an output terminal of the operational amplifier OP2. The two resistors R4 and R5 determine the amplification rate of the operational amplifier OP2. Among the two resistors R4 and R5, the resistor R4 has a first end (node between the resistors R4 and R5), which is connected to an inverting input terminal of the operational amplifier OP2, and a second end, which is connected to an output terminal of the operational amplifier OP2. The operational amplifier OP2 has a non-inverting input terminal connected to the second terminal of the resistor R1 and the corresponding heat dissipation conductor 1d of the Peltier element 1.

An output terminal of the operational amplifier OP1 in the first amplification circuit 2 is connected to an anode of a first diode 8. An output terminal of the operational amplifier OP2 in the second amplification circuit 3 is connected to an anode of a second diode 9. The first and second diodes 8 and 9 each have a cathode connected to the current control circuit IC. The first and second amplification circuits 2 and 3 are configured so as to input the larger one of the output voltages of the first and second amplification circuits 2 and 3 to the current control circuit IC.

The thermistor 4, which forms the resistor R2 in the first amplification circuit 2, is used to detect the ambient temperature. More specifically, in the present embodiment, the thermistor 4 detects the ambient temperature in the area the electrostatic atomization device is arranged. It is preferable that the thermistor 4 be arranged at a location at which the influence of a temperature rise is minimal. The thermistor 4 has the temperature characteristics that are shown by the relationship of the temperature and resistance in the graph of FIG. 3.

The current detection resistor R1 detects the current flowing to the Peltier element 1. The first amplification circuit 2 amplifies voltage that is proportional to the detected current in accordance with the amplification rate determined by the resistance corresponding to the temperature characteristics of the thermistor 4 and the resistance of the resistor R3. The amplified voltage is supplied via the first diode 8 to the current control circuit IC. Further, the second amplification circuit 3 amplifies voltage that is proportional to the detected current in accordance with the amplification rate determined by the resistances of the resistors R4 and R5. The amplified voltage is supplied via the second diode 9 to the current control circuit IC.

In one embodiment of the present invention, the amplification rates of the first and second amplification circuits 2 and 3 (values of R2 to R5) are set so that the output voltage of the second amplification circuit 3 becomes greater than the output voltage of the second first amplification circuit 2 when the ambient temperature is greater than a predetermined temperature and the output voltage of the first amplification circuit 2 becomes greater than the output voltage of the second amplification circuit 3 when the ambient temperature is less than or equal to the predetermined temperature.

In the cooling control circuit 10 according to one embodiment of the present invention, when the ambient temperature is greater than or equal to the predetermined temperature, the current control circuit IC receives the output voltage of the second amplification circuit 3 and controls the current supplied to the Peltier element 1 so as to be constant. When the ambient temperature is less than the predetermined temperature, the current control circuit IC receives the output voltage of the first amplification circuit 2 and controls the current supplied to the Peltier element 1 in accordance with the temperature characteristics of the thermistor 4 as shown in FIG. 3.

When the ambient temperature is greater than or equal to the predetermined temperature, the Peltier element 1 undergoes constant current control with the output voltage of the second amplification circuit 3. Accordingly, when the ambient temperature is greater than or equal to the predetermined temperature, the current does not increase as the temperature increases. This prolongs the life of the Peltier element 1 under high temperatures.

Figure 3:
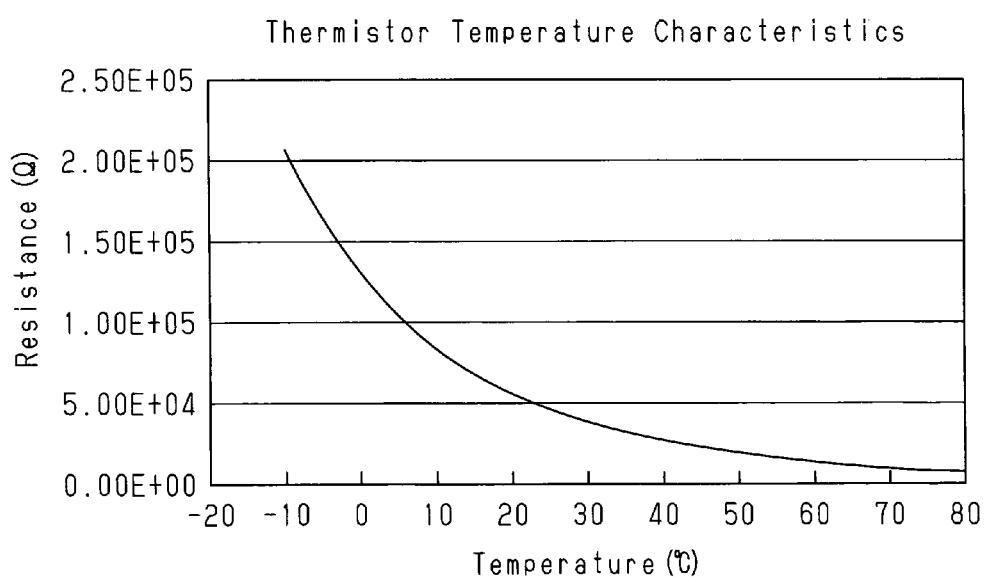
FIG. 3 is a graph showing the thermistor temperature characteristics in the cooling control circuit of FIG. 1.

When the temperature is less than the predetermined temperature, the Peltier element 1 undergoes current control with the output voltage of the first amplification circuit 2 based on the temperature characteristics of the thermistor 4 as shown in FIG. 3. Accordingly, when the ambient temperature is low and less than the predetermined temperature, the Peltier element 1 is controlled so that the current decreases as the ambient temperature decreases. The Peltier element 1 does not become too low such that the condensed water freezes, and the condensed water is generated in a satisfactory manner. This stabilizes electrostatic atomization.

In FIG. 3, the gradient of the temperature characteristics of the thermistor 4 for performing current control, which decreases the current as the ambient temperature decreases when the ambient temperature is less than the predetermined temperature, is achieved by selecting the B characteristic for the thermistor.

The Peltier element 1 is not restricted to the embodiment shown in FIG. 4. For example, a plurality of Peltier elements, each including a P type semiconductor 1a and an N type semiconductor 1b, may be connected in series.

Instead of the discharge electrode 5 that projects from the electrical connector 1c, which is connected to the heat absorption surface of the Peltier element 1, a discharge electrode discrete from the electrical connector 1c may be used. In this case, a basal portion of the discharge electrode is connected to the electrical connector 1c.

The present invention may be applied to an electrostatic atomization device that does not include an opposing electrode.

The invention claimed is:

1. A cooling control circuit for a Peltier element, the cooling control circuit comprising:
   a current detection resistor used to detect current flowing to the Peltier element and including a first terminal, which is connected to the Peltier element, and a second terminal;
   a first amplification circuit including:
      a first operational amplifier having a non-inverting input terminal, which is connected to the first terminal of the current detection resistor, an inverting input terminal, and an output terminal;
      a first resistor including a thermistor and connected between the inverting input terminal of the first operational amplifier and the output terminal of the first amplifier; and
      a second resistor connected between the second terminal of the current detection resistor and the inverting input terminal of the first operational amplifier;
   a second amplification circuit including:
      a second operational amplifier having a non-inverting input terminal, which is connected to the first terminal of the current detection resistor, an inverting input terminal, and an output terminal;
      a third resistor connected between the inverting input terminal of the second operational amplifier and the output terminal of the second amplifier; and
      a fourth resistor connected between the second terminal of the current detection resistor and the inverting input terminal of the second operational amplifier; and
   a current control circuit that receives output voltage of the second amplification circuit when the ambient temperature is greater than or equal to a predetermined temperature and controls the current flowing to the Peltier element so as to be constant based on the output voltage of the second amplification circuit, and receives output voltage of the first amplification circuit that is in accordance with the temperature characteristics of the thermistor when the ambient temperature is less than the predetermined temperature and controls the current flowing to the Peltier element based on the output voltage of the first amplification circuit.

2. The cooling control circuit according to claim 1, wherein the first and second amplification circuits are configured so that the output voltage of the second amplification circuit is greater than the output voltage of the first amplification circuit when the ambient temperature is greater than or equal to the predetermined temperature and the output voltage of the first amplification circuit is greater than the output voltage of the second amplification circuit when the ambient temperature is less than the predetermined temperature.

3. The cooling control circuit according to claim 1, wherein the first to fourth resistors have resistances set so that the output voltage of the second amplification circuit is greater than the output voltage of the first amplification circuit when the ambient temperature is greater than or equal to the predetermined temperature and the output voltage of the first amplification circuit is greater than the output voltage of the second amplification circuit when the ambient temperature is less than the predetermined temperature.

4. The cooling control circuit according to claim 1, wherein the temperature characteristics of the thermistor are set so that the current flowing to the Peltier element decreases as the ambient temperature decreases when the ambient temperature is less than the predetermined temperature.

5. The cooling control circuit according to claim 1, wherein the first amplification circuit amplifies a voltage that is proportional to the current detected by the current detection resistor in accordance with an amplification rate determined by a resistance corresponding to the temperature characteristics of the thermistor and a resistance of the second resistor, and the second amplification circuit amplifies the voltage that is proportional to the current detected by the current detection resistor with an amplification rate determined by resistances of the third and fourth resistors.

6. The cooling control circuit according to claim 5, wherein the temperature characteristics of the thermistor are set so that the current flowing to the Peltier element decreases as the ambient temperature decreases when the ambient temperature is less than the predetermined temperature.

* * * * *